United States Patent Office 2,998,786
Patented Sept. 5, 1961

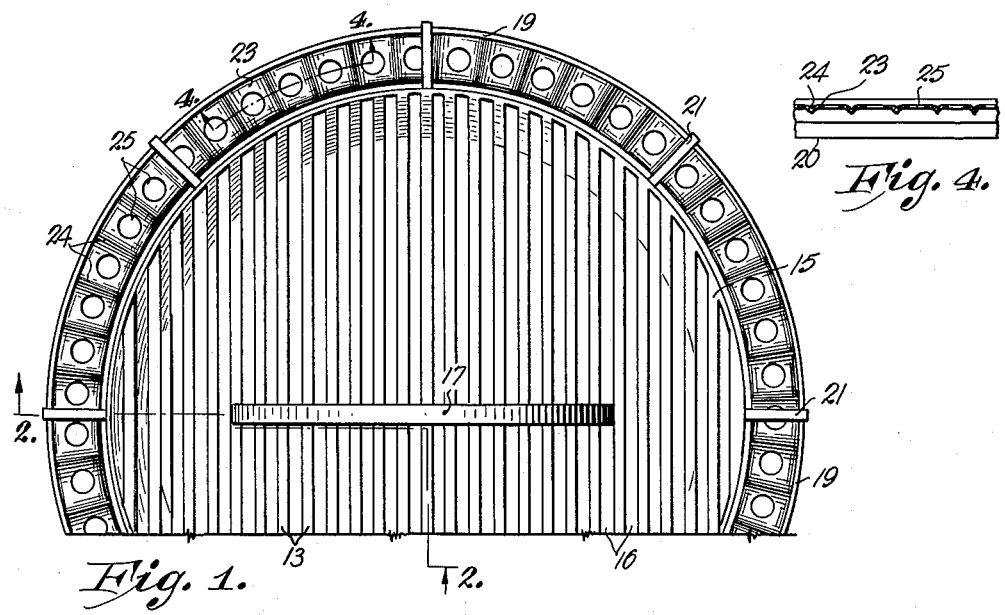
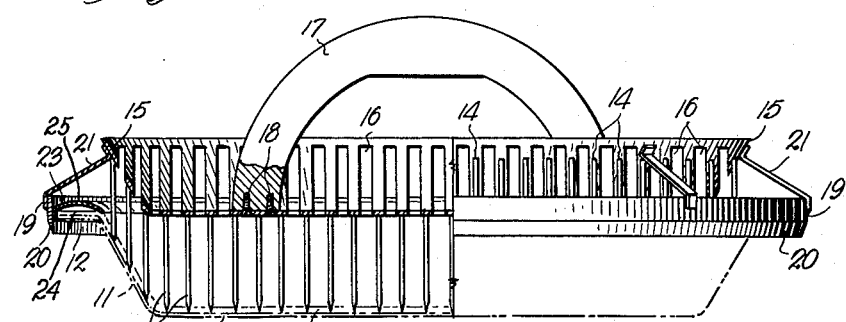
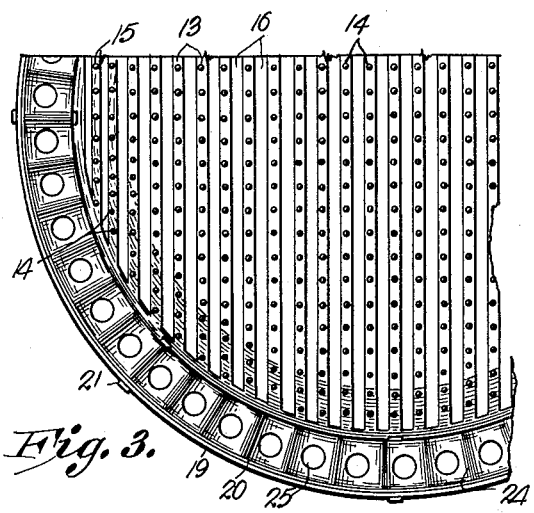
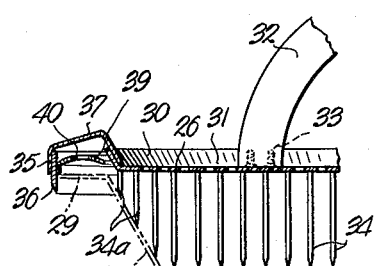
INVENTOR.
Olive R. Sawaya

2,998,786
PIE DOUGH PERFORATOR, FLUTER AND TRIMMER
Olive R. Sawaya, 130 S. Clark St., Salina, Kans.
Filed Feb. 6, 1957, Ser. No. 638,600
8 Claims. (Cl. 107—49)

This invention relates to pie dough manipulators and refers more particularly to a device for perforating a dough layer which will form a bottom crust of a pie, subsequent to said dough being placed in a utensil in which said dough is to be baked, while concurrently placing a design in the portion of the dough layer which is supported by the rim of the baking utensil and trimming off that portion of the layer extending beyond the rim of the baking utensil.

Previously, devices have been provided for the manipulation of dough and the upper layer of pie dough for various purposes such as forming ventilating or outlet openings therein, forming decorative patterns therein, or marking the top crust (or surface) for cutting purposes. The present structure performs functions and has purposes completely different from the above devices.

It is necessary in the baking of "cream" or most "one crust" pie (cream, lemon, custard, chocolate, etc.) to first bake the dough layer which will form the bottom crust for these, and other pies embraced by the category wherein the filler is cooked independently of the crust. With this type pie it is also necessary to perforate the dough layer prior to baking the provide for the release of gases and steam generated therebeneath during the baking process, thus permitting the dough layer to lie flat against the inner surfaces of the baking utensil, and preventing humping, flaking, uneveness of crust, and other undesirable characteristics which would appear in the absence of perforation.

It is thus evident that pricking of the dough layer which will form the bottom crust of a pie improves the crust quality and general characteristics of many different pies.

Many pie makers perforate the layer of dough which will form the bottom crust before placing it in the baking utensil and thus risk tearing thereof in transferring the dough layer to the baking utensil. In addition, this method provides a poor estimate of the amount of dough required to properly cover the inner surfaces and rim of the pie pan. Perforation of localized areas of the dough layer (as with a fork) after it has been placed in the baking utensil often displaces portions of the layer relative other portions, and such is undesirable. Pricking the dough layer by hand is a tedious, time consuming process and, with these methods, it is especially difficult to thoroughly perforate the dough which overlies the sloping sections of the pie pan and circumvent the problem of displacement and tearing of the layer of dough as well. After positioning the dough layer in the pan, most pie makers both decorate and trim any excess dough from around the edges thereof, both of these processes being time consuming and requiring manual skill with delicate handling to avoid further displacement and tearing.

Therefore, an object of the invention is to provide a pie dough perforator which will uniformly and swiftly perforate the dough layer forming the bottom crust of a pie after it is placed in a baking utensil.

Another object of the invention is to provide such a pie dough perforator which will perforate the entire dough layer forming the bottom crust of a pie including the portion lying on the sloping side walls of the baking utensil without displacing or tearing thereof, thus permitting the escape of gases and steam generated from therebeneath during the baking process and allowing the layer of dough to lie flat.

Another object of the invention is to provide such a pie dough perforator which is self-positioning and centering whereby to perforate the entire dough layer forming the bottom crust of a pie with a single stroke.

Another object of the invention is to provide such a pie dough perforator which will force the lower layer of dough to more closely conform to the inner surfaces of the baking utensil, thus insuring a more uniform baking of said dough.

Yet another object of the invention is to provide such a pie dough perforator which, through forcing the layer of dough to conform to the inner surfaces of the pie pan, also insures a more uniform distribution of the filling.

Yet another object of the invention is to provide such a pie dough perforator and fluter which, simultaneous to perforating the entire lower layer of dough, also places a design in the portion of the dough layer supported by the rim of the baking utensil.

Yet another object of the invention is to provide such a pie dough perforator, fluter and trimmer which, in addition to perforating an entire lower layer of dough when supported in a pie pan, and imprinting a design in the dough along the rim of said utensil, also trims away the dough which extends beyond the rim of the pie pan.

A further object of the invention is to provide such a pie dough perforator and trimmer which provides the baker with a better estimate of the amount of dough required to properly cover the inner surfaces and rim of the baking utensil than if such operations were performed prior to the introduction of said dough to said utensil.

Still another object of the invention is to provide such a pie dough perforator, fluter and trimmer wherein free circulation of air to the layer of dough is provided at all times during the perforating, fluting and trimming operations.

Yet another object of the invention is to provide such a pie dough perforator, fluter and trimmer which is simple of construction, cheap to manufacture and rugged and durable of structure.

Other and further objects of the invention will appear in the course of the following description thereof.

In the drawings, which form a part of the instant specification and are to be read in conjunction therewith, two embodiments of the invention are shown and, in the various views, like numerals are employed to indicate like parts.

FIG. 1 is a plan view of a portion of the preferred form of pie dough perforator, fluter and trimmer.

FIG. 2 is a side view with a portion in section thereof of the preferred form of perforator shown in FIG. 1, the portion of the view shown in section taken along lines 2—2 of FIG. 1 in the direction of the arrows.

FIG. 3 is a fragmentary bottom view of the preferred form of the inventive pie dough perforator, fluter and trimmer.

FIG. 4 is a view taken along lines 4—4 of FIG. 1 in the direction of the arrows.

FIG. 5 is a fragmentary side-sectional view of the edge portion of the modification of the invention.

Referring now to the drawings and more particularly to FIG. 2, at 10 is shown the inner surface of the bottom of a pie pan, pie baking container or utensil having sloping side walls 11 and a substantially flat, horizontal rim 12. It should be understood that the conventional form of pie pan is circular in shape but any desired form of pie pan or baking utensil may be employed, provided the shape of the pie dough perforator, fluter and trimmer conforms thereto.

The preferred form of the invention is shown in FIGS. 1, 2, 3 and 4. The invention comprises a combined perforator, fluter and trimmer having a substantially horizontal plate portion 13 with a plurality of downwardly extending, sharply pointed spikes or projections 14 fixed to substantially the entire undersurface thereof. The entire plate portion itself is of an area substantially that of the inner surfaces of the pie pan, including the sloping pan side edges, but the bottom area of the plate is equal substantially to only that of the bottom surface 10 of the pie pan with upwardly extending plate edge portions 15 preferably formed so as to lie substantially parallel with the upwardly sloped edge 11 of the pie pan when the plate central portion overlies and is parallel to the pie pan bottom surface.

The projections or spikes 14 are also fixed to the undersurfaces of the upwardly extending plate edge portions 15 and, if the plate edge portion is formed substantially parallel to the sloping side walls 11 of the pie pan, the spikes 14 on the edge must be of the same length as the spikes 14 on the rest of the plate so that the pointed ends of the projections will simultaneously abut the inner surfaces of the pie pan at all portions thereof. A plurality of slots 16 are formed in the portions 13 and 15 of the plate and preferably extend substantially the entire width thereof. The projections or spikes 14, of course, are fixed to the portions of the plate bounding the slots 16. They are arranged at substantially equal intervals on each row 13 and 15, and the distance between the rows of spikes or projections is also substantially the same. A handle 17 is fixed by screws 18 to the horizontal plate portion 13, and is preferably centered relative the upwardly inclined edge portions 15.

A circumferential band or strip 19, having a sharpened lower edge 20, is positioned peripherally to the plate edge 15 and is carried relative thereto by supports 21. The band 19 is fixed relative the plate 13 so that its cutting edge 20 will abut and shear off any dough extending over the rim 12 of the pan and, as well, pass below said rim before the spikes or projections 14 contact the bottom of the pan 10 on the side walls 11 thereof and preferably before the projections contact the layer of dough which is indicated at 22 as being perforated by the projections 14. The band 19 preferably is of sufficient height to remain engaged with the rim edge 12 when the spikes 14 engage the inner edges of the bottom surface of the pan. Thus it is seen that to perforate the layer of dough 22, the band 19 passes along the outside edge of the rim 12 thus centering and properly positioning the spikes 14 relative the pie pan and layer of dough. More particularly FIGS. 2 and 3 show a substantially horizontally disposed ring or band of metal or material 23 is fixed at its outermost edge to the inside of the trimmer 19 above its lowermost position relative the rim 12 in the perforating operation. Said ring 23 is preferably slightly curved in cross section, as shown. Ring 23 has indentations 24 formed at intervals therealong so as to decorate or form the pie dough between the ring 23 and the rim 12 into a decorative pattern as desired. The lowermost portions 24 of the ring 23 are positioned relative to the trimmer band 19 so as to only place indentations in the dough layer, not to mash it. It should be understood that any desired indentation may be made in the ring 23. Preferably, also, ring 23 has openings or orifices 25 formed therein at regular intervals as, in the instance shown here, between the indentations 24. These orifices permit ventilation of the layer of dough overlying the rim 12 during the perforation and decorative processes and prevent vacuum sticking of the dough to the ring 23. Ring 23 may be fastened or attached also to the upwardly inclined edge 15 or the supports 21, each alone, any two, or all three, if desired.

Referring now to the modification of the invention as shown in FIG. 5, this device differs from the principal structure in that the plate, here indicated at 26, is substantially flat for an area sufficient to overlie the upwardly sloping walls of the pie pan as well as the bottom surface thereof. The inner surface of the bottom of the pie pan is indicated at 27, like surfaces of the upwardly sloping walls at 28, and the rim portion at 29. Peripheral of the flat portion of the plate 26 is the upwardly turned edge 30 to base attachment of the various other parts of the device. Slots 31 are formed in the plate 26 and extend substantially the entire width thereof as shown. Handle 32 is fixed to the plate 26 by screws 33. A plurality of spikes or projections 34 extend downwardly from the entire undersurface of the flat portion of the plate 26, with the spikes of sufficient length to base the plate 26, at the lowermost depths thereof, above the rim 29. The spikes 34a, above the side sloping portions 28 of the pan, are of lesser length than the spikes 34 above the inner edge at the bottom surface thereof, paralleling to coincide with said slope. The distance between the periphery of the plate 26 and the inner edge of the rim 29 is preferably greater than the average thickness of a layer of pie dough.

A trimmer band or ring 35, having a sharpened lower edge 36, is positioned circumferentially of the periphery of the plate 26 and fixed thereto by supports 37. The band 35 is fixed relative the plate 26 so as to shear any excess dough which may extend past the outer edge of the rim 29 and also so the edge 36 passes below the upper edge of the rim 29 before the spikes 34 and 34a abut the layer of dough (not shown).

Fixed inboard of the trimmer by engaging means 38 is a substantially horizontal band or ring 39 of metal or other material operable to form or decorate the portion of the dough layer supported by the rim of the baking utensil, as previously described relative element 23 in the preferred structure. Band 39 has apertures 40 formed centrally thereof to avoid vacuum sticking of the device to the dough and indentations or grooves 41 formed at regular intervals therealong to perform the fluting process. Band 39 may be fixed to, or formed integrally with, the trimmer 35, and attached to the plate 26 by interengaging supports 37. The band 39 is so positioned relative the trimmer 35 as to only indent the dough, not to mash it.

The operation of both devices is substantially the same, the only difference being that the device of FIG. 3 allows for a more free circulation of fresh air relative to the dough layer than the structure shown in FIG. 5. Grasping the handle 17 or 32, the operator or baker lifts either of the devices above the baking utensil into which the lower layer of dough has been placed over previously greased surfaces of the pan. The operator moves the device downwardly until the lower edges 20 or 36 of the trimmers engage the pan rim and passes therebeyond. Excess dough is thus sheared off, the shearing operation taking place simultaneously all around the rim. As the device is further lowered, the spikes or projections 14 or 34 and 34a engage the dough layer, precisely position it relative the bottom of the pan and perforate it at very closely spaced intervals throughout all portions, including the dough lying on the sloping side walls of the pie pan. Simultaneous with this perforation, the fluter 23 or 39 impresses a design in the dough layer supported by the rim 12 or 29. Air may enter apertures 16 or 31 in the plate 13 or 26 to obviate dough adhering to the projections 14 or 34 and 34a. The apertures 25 or 40 in the fluter prevent any dough adhering thereto or to trimmer 19 or 35. When the projections 14 or 34 and 34a contact the inner surface of the baking utensil at 10 or 27, the layer of dough has been perforated, fluted and trimmed, and the instrument may be withdrawn, the trimmer regulating the withdrawal so as not to displace the layer of dough within the pan. The dough layer is now ready for baking.

From the foregoing it will be seen that this invention is well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter hereinabove set forth or shown in the accompanying drawings is to be interpreted as illustrative and not in a limiting sense.

Having thus described my invention, I claim:

1. A perforator for a lower dough layer of a pie to be baked in a dough supporting surface comprised of a bottom wall bounded by an outwardly sloping side wall; the perforator composed of a plate member, having upper and lower surfaces with a handle secured to said upper surface, said plate member of a size and form adapted to overlie substantially all of said dough supporting surface when in operating position with respect thereto, a plurality of substantially equally spaced perforating elements, having sharpened lower ends, secured to and extending downwardly from said lower surface of said plate, said elements being distributed over the entire lower plate surface, said sharpened ends of said perforating elements which overlie said sloping side wall terminating at points lying along an imaginary slope coincident with the slope of said side wall, whereby said sharpened ends perforate at spaced intervals the entire lower dough layer of the pie.

2. A perforator, as in claim 1, wherein said perforator has a plurality of ventilation apertures formed in said plate and extending substantially along the entire width of the portion thereof overlying the dough supporting surfaces.

3. A perforator, as in claim 1, wherein all of the perforating elements are positioned substantially at right angles to the portion of said plate which overlies the bottom of said dough supporting surface.

4. A perforator, as in claim 1, wherein the central portion of said plate, which is adapted to overlie substantially all of said bottom wall, is substantially flat and the peripheral portion of said plate, which is adapted to overlie the sloping side wall, is angled upwardly and outwardly from the flat portion thereof at the same angle of incidence as the side wall of said dough supporting surface bears to the bottom thereof, and wherein the spacing of said perforating elements, relative to each other, is substantially equidistant.

5. A perforator, as in claim 1, wherein said sloping side wall of said dough supporting surface terminates in a horizontally disposed rim portion, and wherein the peripheral portion of said plate has secured thereto a downwardly directed skirt means for simultaneously trimming excessive dough from around said rim, and for stabilizing said perforator relative to said dough supporting surface before said dough layer is contacted by said perforating elements.

6. A perforator, as in claim 5, wherein said skirt means is provided inwardly thereof with a horizontally disposed band, of correspondent shape and size to the rim of said dough supporting surface, said horizontal band having apertures therein throughout the extent thereof, and being further provided with a fluted lower surface for the purpose of implanting a design in the dough supported by said rim, and whereby release of said fluted band from said dough layer is facilitated through the venting action provided by said apertured band.

7. A perforator for a lower layer of dough to be baked in a dough supporting surface comprised of a bottom wall bounded by an upwardly and outwardly sloping side wall, the perforator composed of a plate member, having an upper and lower surface, with a handle secured to said upper surface, said plate of a size and form adapted to overlie substantially all of said dough supporting surface when in operating position with respect thereto, the portion of the plate which overlies the bottom of the dough supporting surface is substantially flat and the peripheral portion of the plate, which is adapted to overlie said sloping side wall, is upwardly and outwardly angled relative thereto, with a plurality of pointed, fixed projections extending downwardly from said lower surface of said plate, said projections being substantially equally spaced relative to each other whereby to perforate said lower dough layer supported by the bottom and side walls of said dough supporting surface.

8. A perforator and trimmer, as in claim 5, wherein said trimmer is formed separately from, but at fixed relationship to, said perforator, thus insuring uniform venting action, and wherein said trimmer band is provided with a sharpened lower edge to insure trimming away excessive portions of said dough layer at the point of departure thereof from said dough supporting surface.

References Cited in the file of this patent
UNITED STATES PATENTS

| | | |
|---|---|---|
| 684,709 | Nickel | Oct. 15, 1901 |
| 1,281,200 | Perry | Oct. 8, 1918 |
| 1,519,752 | Bannister | Dec. 16, 1924 |
| 2,010,182 | Foutch, Jr. | Aug. 6, 1935 |
| 2,409,021 | Dale | Oct. 8, 1946 |
| 2,731,926 | Eckhoff | Jan. 24, 1956 |